No. 665,994. Patented Jan. 15, 1901.
J. L. CLARK.
LID FOR STOVE TOPS.
(Application filed June 4, 1900.)
(No Model.)
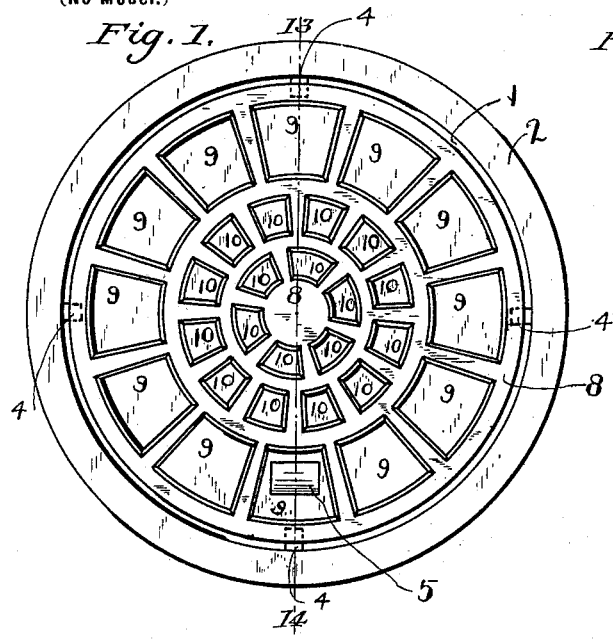
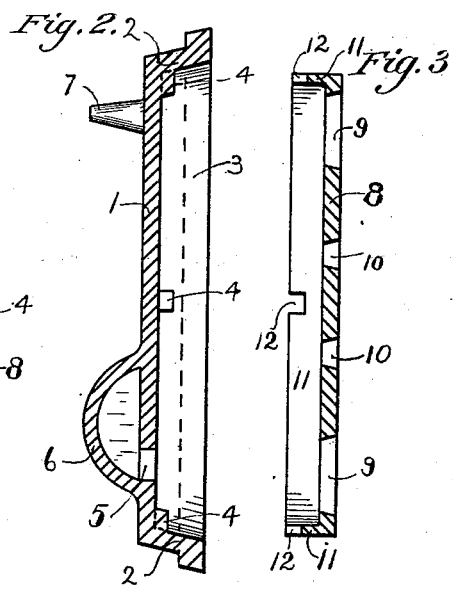
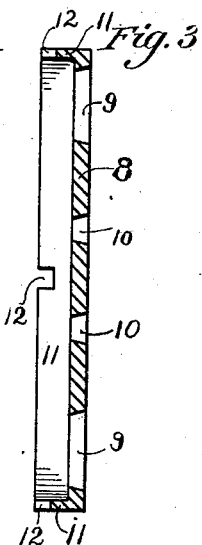
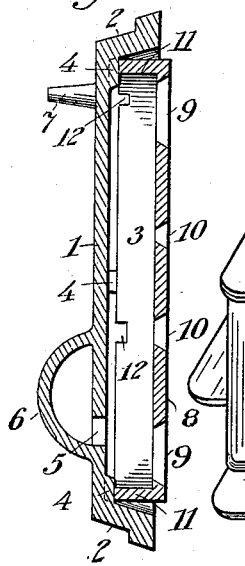
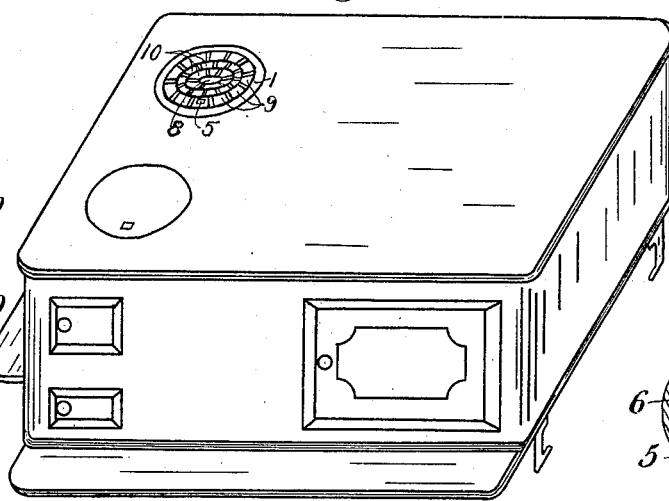
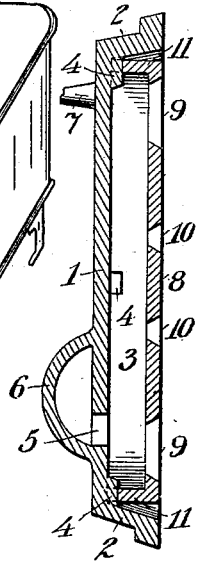
Witnesses
G. S. Pond
F. S. Nye
Inventor
John L. Clark
per Edward J. Hunt
Attorney
THE NORRIS PETERS CO., PHOTO-LITHO., WASHINGTON, D. C.

UNITED STATES PATENT OFFICE.

JOHN LORING CLARK, OF BANGOR, MAINE.

LID FOR STOVE-TOPS.

SPECIFICATION forming part of Letters Patent No. 665,994, dated January 15, 1901.

Application filed June 4, 1900. Serial No. 18,927. (No model.)

*To all whom it may concern:*

Be it known that I, JOHN LORING CLARK, a citizen of the United States of America, and a resident of No. 11 Prentiss street, Bangor, county of Penobscot, State of Maine, have invented certain new and useful Improvements in Lids for Stove-Tops, of which the following is a specification.

My invention relates to a stove-lid, and has for its object to provide a lid having a ventilating chamber or space which does not communicate with the fire-box of the stove and capable of being increased or diminished in order to regulate the heat imparted to the utensil placed on the lid and also to cause a circulation of air from the center of the lid outwardly and upwardly about the base and sides of the utensil, thereby preventing the scorching or burning of the contents of said utensil without affecting the draft of the fire.

My invention consists of a lid comprising two members—an upper perforated member and a lower imperforate member—one being movable or adjustable with relation to the other; and it further consists in the construction, combination, and arrangement of the parts thereof more fully hereinafter described and claimed.

My invention is illustrated in the accompanying drawings, in which—

Figure 1 is a plan view of my improved lid, showing upper and lower members placed together. Fig. 2 is a sectional view of the lower member on the line 13 14 of Fig. 1. Fig. 3 is a sectional view of the upper member on plane 13 14 of Fig. 1. Fig. 4 is a perspective view of a cooking-stove with my improved lid in place in one of the holes. Fig. 5 is a sectional view showing the upper member in locked position. Fig. 6 is a sectional view showing upper member in its raised position.

In the drawings, in which like numerals of reference indicate like parts throughout the several views, my lid comprises two members, the lower imperforate member 1 consisting of a bottom having an upwardly-extending flange 2 around its edge forming an air space or chamber 3, the upper surface of the bottom having lugs 4 formed thereon adjacent the flange 2 and a slot 5 for the insertion of a lifter, the under surface having an enlargement 6, in which the slot 5 is made, and also legs 7, formed thereon. The upper member, which is adapted to be seated in the lower member, consists of a top or grid 8, provided with openings 9 and 10 for the passage of air, the openings 9 also serving to allow the inserting of a lifter therethrough into the hole 5 in the lower member for removing the lid from the stove when desired. The top has a downwardly-extending annular flange 11 around its edge having slots 12, adapted to engage the lugs 4 on the upper surface of the bottom of the lower member to lock it when the upper member is in its lowered position flush with the surface of the stove, and said flange is adapted to rest on the top of the lugs 4 when the upper member is in its raised position.

The operation of my lid is as follows: Place the upper member or grid 8 in the space or chamber 3 of the lower member, so that slots in the annular rim 11 will engage the lugs 4, when the upper member will be locked in its lowered position and one of the holes 9 will register with the hole 5. A lifter can then be inserted to remove the lid from the pot-hole or place it thereon. If a utensil is placed thereon whose base is smaller than the diameter of the cover, through the medium of the holes in the upper member and the air-chamber in the lower member a forced circulation of air is constantly had underneath from the center outwardly and upwardly about the base and sides of said utensil, and by this means the substance to be cooked is supplied with a more evenly-distributed temperature than if the pot were in direct contact with a lid of the ordinary style or in the open pot-hole, the lower imperforate member also preventing the smoke and blaze from reaching the base of the utensil and not affecting the draft of the stove. If it be desired to place a utensil thereon whose base is larger than the diameter of the lid, the upper member or grid is raised and turned to a position so that the annular flange 11 rests on the top of the lugs 4, when the upper member or grid will be elevated to a plane above that of the top of the stove and the same result will be obtained as before stated.

I do not wish to limit my invention to the particular pattern of grid shown, as it is readily seen that the pattern thereof or position of the holes may be changed without departing from the spirit of my invention.

Having described my invention, what I claim is—

1. In a stove-lid, the combination with a lower hollow imperforate member forming an air-chamber, and having a slot, of an upper detachable perforate member having a downwardly-extending flange adapted to fit into the depression in the lower member, substantially as described.

2. In a stove-lid, the combination with a lower hollow imperforate member having an air-chamber, and having a slot therein, of an upper member having one or more openings therein leading into the air-chamber of the lower member, and one of said openings registering with the slot in the lower member, so that a lifter can be inserted for removing both members, substantially as described.

3. In a stove-lid, the combination with a lower hollow imperforate member forming an air-chamber, and having lugs therein, of an upper member having one or more openings therein leading into the air-chamber of the lower member, a downwardly-extending flange on the upper member having slots therein adapted to engage the lugs for locking the upper member in its lowered position, the flange adapted to rest upon said lugs in the lower member for placing the upper member in its raised position, substantially as described.

4. In a stove-lid, the combination with a lower hollow imperforate member having a slot in its bottom, of an upper member having one or more openings therein leading into the lower member and capable of registering with said slot of said lower member, said one or more openings and said slot being for the insertion of a lifter to remove the lid or put it in place and said one or more openings for the further purpose of allowing a free passage of air into the air-chamber formed in said lower member, substantially as shown and described.

Signed by me this 1st day of June, 1900.

JOHN LORING CLARK.

Witnesses:
 WM. B. PIERCE,
 E. J. HUNT.